Sept. 2, 1947. J. A. PATTERSON 2,426,706
SEGREGATION OF OLEFINIC HYDROCARBONS BY EXTRACTIVE DISTILLATION
Filed Oct. 26, 1943
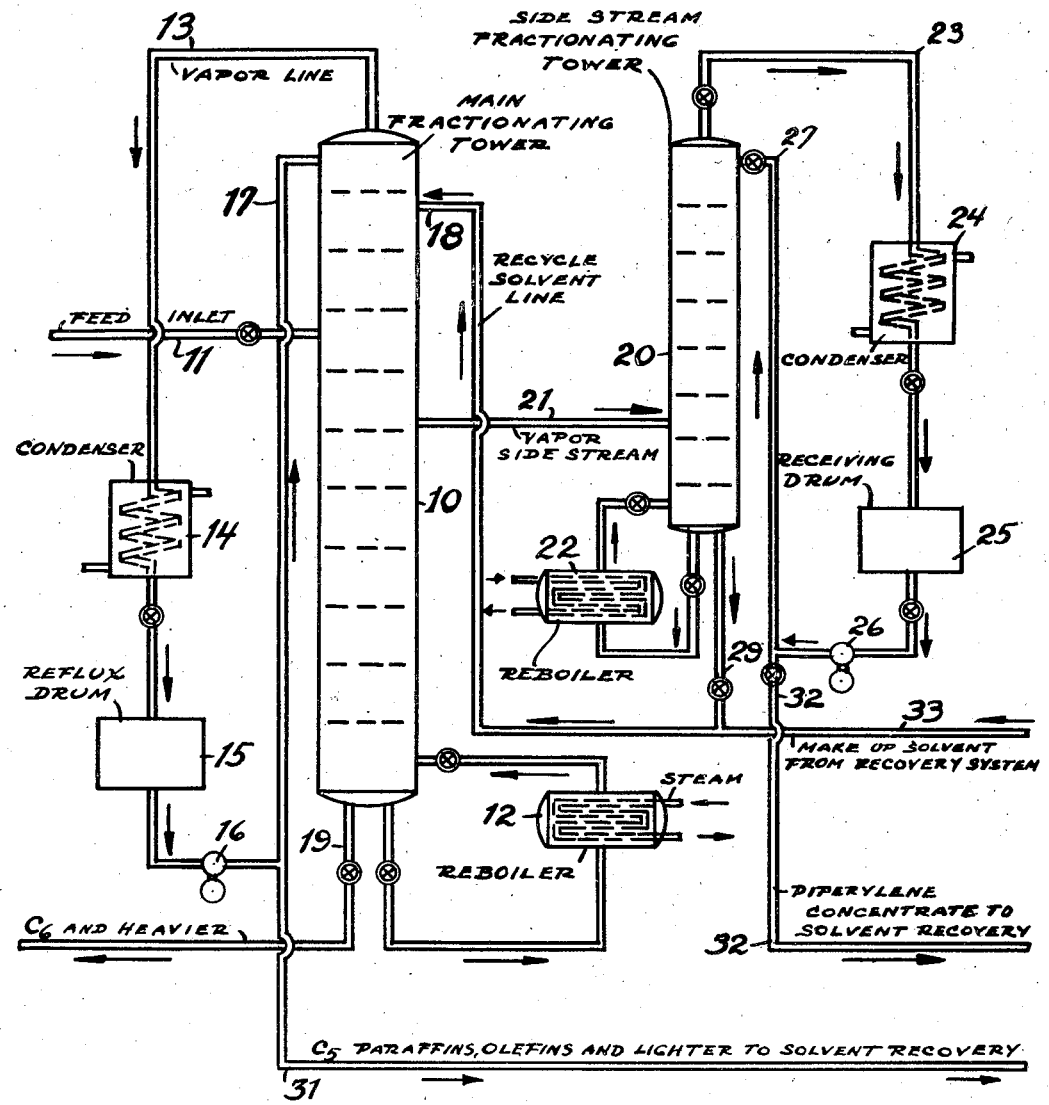
John A. Patterson, Inventor
By P. L. Young, Attorney Patented Sept. 2, 1947

2,426,706

UNITED STATES PATENT OFFICE 2,426,706

SEGREGATION OF OLEFINIC HYDROCARBONS BY EXTRACTIVE DISTILLATION

John A. Patterson, Westfield, N. J., assignor to Standard Oil Development Company, a corporation of Delaware Application October 26, 1943, Serial No. 507,709

10 Claims. (Cl. 202—39.5)

1

This invention relates to treatment of mixtures of hydrocarbons of above the $C_3$ range to effect the segregation of paraffins, monoolefins, and diolefins. The invention relates particularly to the separation of diolefins containing five carbon atoms in the molecule from their admixture with other hydrocarbons in products resulting from the heat treatment of petroleum fractions.

It is old in the art to effect the separation of hydrocarbons from complex mixtures by processing dependent upon particular physical and chemical properties of the hydrocarbons. Thus, in the past, fractional distillation, azeotropic distillation, extractive distillation, solvent extraction, and fractional crystallization have been employed as means of effecting the separation of groups and, in some cases, individual hydrocarbons from complex mixtures. Particular combinations and particular features of processing are the bases of many commercial processes for the segregation and purification of hydrocarbons. The present invention relates to a particular manner of processing for the separation from complex mixtures of highly concentrated diolefin materials—the processing being based upon a combination of fractional and extractive distillations.

As a means of furnishing a basis of understanding the invention, analysis is presented of the use made of the differences in physical properties of the various hydrocarbons utilized in processing according to the invention. Normal distillation of a mixture effects separation of the constituents upon the basis of differences at varying temperatures of the vapor pressures of the various compounds present in admixture one with the other. Distillation effected in the presence of a solvent, however, effects separation of the constituents upon the basis of differences at different temperatures of the vapor pressures of the various compounds in the presence of such solvent material. The presence of the solvent in such cases effects in different degrees positive deviations from Raoult's law; the volatilities of the various hydrocarbons being greater in the presence of the added liquid than would be expected upon the basis of their normal vapor pressures. In the case of a hydrocarbon mixture containing paraffins, monoolefins and diolefins, the added liquid may modify the relative volatilities of the various type hydrocarbons in such a way that in a narrow boiling fraction the paraffins will be the most volatile group of constituents; the monoolefins the less volatile group, and the diolefins the least volatile group.

2

Liquids suitable in the solvent distillation of hydrocarbon mixtures—whether it be azeotropic or extractive distillation—are in general the stable organic liquids of the high dielectric constants. Such compounds are the normally liquid polar organic substances containing oxygen, nitrogen, sulfur, and related elements. Such substances have in general also the following characteristics:

1. High solubility for the hydrocarbons;
2. Marked effect on relative volatility;
3. Readily separable from the hydrocarbons by distillation or when azeotropes are formed by solvent extraction, or other means;
4. Sufficient volatility to permit stripping without requiring the use of high temperatures;
5. Chemical stability when heated in the presence of hydrocarbons and non-corrosiveness;
6. Commercial availability.

In the case of the separation of the $C_5$ hydrocarbons from their admixture with other hydrocarbons, acetone, furfural, pyridine, and amines, and their admixtures with water, have been found to be particularly advantageous.

It has been previously proposed to effect the segregation of paraffins, monoolefins, and diolefins from complex mixtures by a suitable combination of fractional and extractive distillation systems. Such processing necessitates extensive equipment, since separate units are considered necessary for effecting the fractional distillation and the extractive distillation. The present invention is an improvement over such processing in combining the fractional distillation and the extractive distillation in a single fractionating unit; the upper section of the unit functioning as an extractive distillation system, while the lower section functions as a fractionating system for the separation of the desired diolefin from the higher hydrocarbons in the residue.

In the distillation of a complex hydrocarbon mixture in the presence of a suitable solvent, the paraffins and monoolefins with a specified number of carbon atoms exhibit an increase in relative volatility so that they can be distilled overhead with the lighter hydrocarbons containing a lower number of carbon atoms in the molecule—thus leaving the corresponding diolefins in the residue with hydrocarbons of higher carbon content. Thus, in the presence of a sufficient quantity of aqueous acetone as a solvent, the $C_5$ paraffins and monoolefins can be distilled with the $C_4$ and lighter hydrocarbons from a complex mixture—leaving the diolefins with the residual C₆ and higher hydrocarbons. On the other hand, in the lower fractionating section of the tower the desired diolefin is separated from the heavier hydrocarbons and concentrated in the intermediate zone between the two sections from which it can readily be withdrawn in high concentration together with the solvent. The solvent must be of such volatility as to be readily separated from the higher boiling hydrocarbons in the top of the fractionating section.

Taking the separation of transpiperylene from an aromatic distillate produced by the high-temperature cracking of a petroleum distillate as a suitable example of the process of the invention, the feed stock to the combination tower of the invention is introduced upon one of the upper series of plates in the top section. The solvent of volatility intermediate between the lightest and the heaviest boiling constituents of the feed stock is introduced a few plates above the feed supply near the top of the tower in volume up to about twice that of the feed supply. The solvent employed in such processing is commonly aqueous acetone. From an appropriate plate near the middle of the tower, a vapor side stream is removed which contains the major part of the transpiperylene in addition to a considerable amount of solvent.

The vapor side-stream material is conducted to a separate tower in which the piperylene-acetone-water azeotrope is distilled overhead, and concentrated solvent obtained as residue and returned to the main fractionating tower. Below the plate in the main tower on which the side-stream material is withdrawn, the tower functions as a fractionator to remove solvent and the lower boiling diolefin from the higher boiling (C₆ and higher) residue—thereby concentrating the desired diolefin in the intermediate section of the tower from which the side-stream material is thus advantageously withdrawn.

The top of the fractionating tower, that is above the point of the introduction of the solvent, functions to concentrate the azeotropic mixture of the C₅ paraffins and monoolefins with the added solvent in addition to the C₄ and lighter hydrocarbons. The solvent content of the overhead streams from the main fractionating tower and the side stream tower may be removed by extraction with water or other suitable means. The solvent so obtained is re-concentrated and returned to the main tower so as to maintain a high concentration of solvent which is necessary for the extractive distillation operation. By maintaining a suitable reflux ratio at the top of the main tower, the major part of the aqueous acetone solvent will be held back and prevented from going overhead. Similarly, the amount of solvent going overhead in the side stream tower is that of the acetone and water contained in the piperylene-acetone-water azeotrope. In addition, the fractionating section in the bottom of the main fractionating tower prevents solvent from being rejected with the bottoms. This means that the major part of the solvent remains within the extractive distillation zone of the main tower and when once built up to the desired concentration, the solvent content can be maintained at about that level by making up the amounts of the solvent removed in the azeotropic mixtures.

In order to illustrate the invention more clearly, the following detailed description of processing is presented. The reference numerals given in the description refer to the accompanying drawing which presents a suitable lay-out of equipment and indicates a suitable flow of materials for processing according to the invention. In this illustration, example will be taken of the separation of transpiperylene as obtained from the treatment of a debutanized distillate stream from a vapor phase cracking of a virgin gas oil. A specific example of a typical debutanized stream has the following molar percentage composition:

| | |
|---|---|
| Butenes | 1.0 |
| Pentene-1 | 9.4 |
| 2-methyl butene-1 | 2.8 |
| Isoprene | 2.1 |
| Pentenes-2 | 2.0 |
| N-pentane | 1.0 |
| 2-methyl butene-2 | 2.1 |
| Cyclopentadiene | 1.3 |
| Transpiperylene | } 4.9 |
| Cispiperylene | |
| Cyclopentene | 2.1 |
| C₆ hydrocarbons | 23.2 |
| C₇ hydrocarbons | 18.5 |
| C₈ hydrocarbons | 9.5 |
| C₉ hydrocarbons | 20.1 |

The feed is introduced into the processing equipment through line 11 into the upper portion of the main fractionating unit 10. The unit 10 may be any type of fractionating equipment but preferably as illustrated, is a bubble-plate tower and contains about 70 plates. The tower 10 is operated under just sufficient pressure so that the distillate from the top of the tower can be easily condensed with available cooling water. The tower is shown as being complete with the reboiler 12, vapor line 13, condenser 14, reflux drum 15, reflux pump 16, reflux return line 17, a solvent line 18, and a bottoms line 19. The tower functions by means of the heat supplied from the reboiler 12 and reflux supply through line 17. For a feed stock of the composition of molar percentage composition, as previously given, the solvent fed to the system through line 18 is acetone containing about 10% water and in a volume about equal to that of the feed. With acetone containing about 10% water, which has a volatility intermediate between the desired C₅ diolefins and the higher boiling residue from the feed stock, the distribution of plates between the upper extractive distillation zone and the lower fractionating zone in the tower 10 is about 40 plates in the upper extraction distillation zone, and the remaining 30 in the lower fractionating zone.

The overhead distillate removed through line 13 thus consists of the ternary azeotropes of the C₅ paraffins and the monoolefins with the added acetone and water, in addition to the C₄ and lighter hydrocarbons present in the feed. The vapor is condensed in equipment 14, and cooled in drum 15 from which the major portion passes through pump 16 and line 17 to supply the reflux to the tower 10. The remainder of the distillate material is removed through line 31 to a separate unit not shown for the recovery of the solvent. A vapor side stream is withdrawn from the tower 10 through line 21, and introduced into distillation equipment 20.

Distillation equipment 20 is similar to, but smaller than, unit 10, and thus is shown as being a fractionating tower and usually contains about 30 plates. The tower 20 is shown as being complete with reboiler 22, vapor line 23, condenser 24, reflux drum 25, pump 26, reflux line 27, and bottoms withdrawal line 29. The tower is operated at essentially the same pressure as tower 10. The major part of the heat required to operate the tower 10 is supplied by the heat content of the vapor introduced through line 21. Additional heat necessary to remove hydrocarbons from the solvent in the lower part of the tower is supplied through reboiler 22.

The tower 20 may be considered as functioning in a dual capacity, namely, an upper portion containing about 20 plates and a lower portion containing the remaining 10 plates. In the upper portion fractionation is effected of the piperylene-acetone-water azeotrope from excess solvent. In the lower portion of the tower the remaining hydrocarbon content of the solvent is removed. The piperylene-acetone-water azeotrope is removed through line 23, condensed in equipment 24, and cooled in the drum 25. A portion of the condensate is passed through pump 26 and line 27 to supply reflux to control the operation of the tower. The remainder of the distillate is withdrawn from the drum 25 through line 32 for the separation of the piperylene from the solvent.

The solvent is recovered in units not shown from the overhead streams from towers 10 and 20, and after re-concentration is returned to the system through line 33. Usually in processing a feed stock as previously given, about 90% of the solvent supplied to the processing equipment through line 18 is returned to equipment 10 from equipment 20. In other words, in such processing about 10% of the solvent introduced through line 18 is required to be added through line 33 in order to maintain the solvent at the concentration desired for satisfactory operation.

Specific illustration of processing according to the invention is presented in the following analysis data upon the various fractions obtained.

| | Feed, Per Cent | Main Tower Overhead, Per Cent | Bottoms, Per Cent | S. S. Tower Overhead, Per Cent |
|---|---|---|---|---|
| Butenes | 1.0 | [1]4.2 [2](3.8) | | |
| Pentene-1 | 9.4 | 39.7 (35.3) | | |
| 2-methyl butene-1 | 2.8 | 11.8 (10.6) | | |
| Isoprene | 2.1 | 8.9 (8.0) | | |
| Pentenes-2 | 2.0 | 8.4 (7.6) | | |
| N-pentane | 1.0 | 4.2 (3.8) | | |
| 2-methyl butene-2 | 2.1 | 8.9 (8.0) | | |
| Cyclopentadiene | 1.3 | 5.1 (4.6) | | [2]2.0 [2](1.8) |
| Piperylenes | 4.9 | 0.4 (0.4) | 0.1 | 96.0 (86.4) |
| Cyclopentene | 2.1 | 8.4 (7.6) | 0.0 | 2.0 (1.8) |
| $C_6$ | 23.2 | | 32.6 | |
| $C_7$ | 18.5 | | 25.9 | |
| $C_8$ | 9.5 | | 13.3 | |
| $C_9+$ | 20.1 | | 28.1 | |
| Solvent | | 10 | | 10 |

[1] Compositions on solvent free basis.
[2] Compositions on total composition basis.

The process of the invention may be applied to the concentration of other diolefins such as isoprene, $C_6$ and higher diolefins by suitable adjustment of operating conditions and the selection of a suitable solvent. While the process of the invention does not necessitate producing diolefin product of high purity, the product usually contains no substantial amount of any hydrocarbon which would interfere with the operation or in general in the utilization of the main product for the subsequent preparation of many commercial products, such as synthetic rubber.

The particular advantages of processing according to the invention are with regard to the economics of processing—particularly in the saving of reboiler and condenser equipment which are more generally required when separate units for fractional distillation and extractive distillation as normally carried out, are employed. The process of the invention is not merely a combination of fractional and extractive distillation units but an improvement over such processing in addition to the economy of the equipment involved.

What is claimed is:

1. A process for separating piperylene from a hydrocarbon mixture containing piperylene, olefins and paraffins of 5 carbon atoms per molecule and higher boiling hydrocarbons of at least 6 carbon atoms per molecule, comprising passing said hydrocarbon mixture as feed to a distillation tower, supplying acetone to the upper portion of said tower, in substantial excess of the amount of acetone to be distilled overhead as hereinafter described, at a point substantially above the feed level to provide a zone of extractive distillation between the feed supply and the acetone supply, supplying heat to the bottom of said distillation tower to exclude substantially all piperylene and acetone from the tower bottoms and withdrawing said tower bottoms, comprising essentially said $C_6$ and heavier hydrocarbons present in the feed, withdrawing an overhead distillate from the top of said column comprising acetone and substantially all the $C_5$ hydrocarbons except piperylene present in the feed, withdrawing a vapor side stream from said tower, at a point substantially below the feed, comprising acetone and the major portion of the piperylene in the feed in a state of greatly increased purity with respect to other hydrocarbons and separating the piperylene from the acetone in said side stream.

2. Process according to claim 1 in which said acetone contains about 10% water.

3. Process according to claim 1 in which said acetone is supplied to the distillation tower in a proportion of about 1 to 2 volumes per volume of feed supplied thereto.

4. Process according to claim 1 in which said hydrocarbon mixture is a debutanized distillate fraction of a cracked petroleum oil.

5. A process for separating olefinic hydrocarbon from a mixture containing relatively more saturated hydrocarbons of the same number of carbon atoms and also hydrocarbons having a greater number of carbon atoms per molecule than said olefinic hydrocarbons, comprising passing said hydrocarbon mixture as feed to a distillation tower, supplying thereto a normally liquid polar organic solvent capable of forming azeotropes with said relatively saturated hydrocarbons and having a volatility between those of the lightest and heaviest hydrocarbons in said mixture, to the upper portion of said distillation tower, in substantial excess of the amount of solvent to be distilled overhead as hereinafter described, and at a point substantially above the feed level to provide a zone of extractive distillation between the feed supply and the solvent supply, supplying heat to the bottom of said distillation tower to exclude substantially all of said olefinic hydrocarbon and solvent from the tower bottoms, withdrawing said tower bottoms comprising essentially the said hydrocarbons having a relatively greater number of carbon atoms per molecule present in the feed, withdrawing a distillate from the top of said column comprising azeotropes of said solvent and said relatively more saturated hydrocarbons present in the feed, withdrawing a side stream from said tower, at a point substantially below the feed, comprising said solvent and the major portion of the said olefinic hydrocarbon in the feed, in a state of greatly increased purity with respect to other hydrocarbons, and separating the said olefinic hydrocarbon from the solvent in said side stream.

6. Process according to claim 5 in which said hydrocarbon mixture comprises a debutanized distillate fraction of cracked petroleum and said olefinic hydrocarbon is a pentadiene.

7. Process according to claim 6 in which said solvent is acetone.

8. Process according to claim 7 in which said solvent is acetone containing about 10% water.

9. Process according to claim 5 in which said solvent is furfural.

10. Process according to claim 5 in which said solvent separated from said side stream is returned to said distillation tower.

JOHN A. PATTERSON.

REFERENCES CITED

The following references are of record in the file of this patent:

UNITED STATES PATENTS

| Number | Name | Date |
|---|---|---|
| 2,316,126 | Geckler | Apr. 6, 1943 |
| 1,948,777 | Young | Feb. 27, 1934 |
| 2,186,524 | Frey | Jan. 9, 1940 |
| 2,113,965 | Roelfsema | Apr. 12, 1938 |
| 2,288,126 | Dunn et al. | June 30, 1942 |
| 2,302,608 | Field | Nov. 17, 1942 |
| 2,290,636 | Deanesly | July 21, 1942 |
| 2,372,941 | Evans | Apr. 3, 1945 |
| 2,371,342 | Mayfield | Mar. 13, 1945 |
| 2,325,379 | Durrum | July 27, 1943 |
| 2,377,049 | Sounders | May 29, 1945 |
| 2,408,922 | Evans | Oct. 8, 1946 |
| 2,380,019 | Bloomer | July 10, 1945 |

OTHER REFERENCES

Rose et al., Bureau of Standards Journal of Research, vol. 21, pages 167–174, Aug. 1938. (Copy in Scientific Library.)